(12) United States Patent
Tanaka et al.

(10) Patent No.: US 10,374,366 B2
(45) Date of Patent: Aug. 6, 2019

(54) CABLE BRANCHING STRUCTURE

(71) Applicant: Yazaki Corporation, Minato-ku, Tokyo (JP)

(72) Inventors: Masahiro Tanaka, Kakegawa (JP); Hajime Kato, Kakegawa (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 124 days.

(21) Appl. No.: 14/353,600

(22) PCT Filed: Oct. 31, 2012

(86) PCT No.: PCT/JP2012/078150
§ 371 (c)(1),
(2) Date: Apr. 23, 2014

(87) PCT Pub. No.: WO2013/065728
PCT Pub. Date: May 10, 2013

(65) Prior Publication Data
US 2014/0305696 A1    Oct. 16, 2014

(30) Foreign Application Priority Data

Nov. 2, 2011  (JP) ................................. 2011-241030

(51) Int. Cl.
*H01R 13/6592* (2011.01)
*H01R 12/59* (2011.01)
(Continued)

(52) U.S. Cl.
CPC ........... *H01R 13/6592* (2013.01); *H01R 4/28* (2013.01); *H01R 9/032* (2013.01); *H01R 12/594* (2013.01);
(Continued)

(58) Field of Classification Search
CPC .... H01R 13/53; H01R 13/516; H01R 13/641; H01R 13/648; H01R 13/5213;
(Continued)

(56) References Cited

U.S. PATENT DOCUMENTS 4,560,828 A * 12/1985 Franckx .............. B29C 61/0641
174/71 R
4,640,980 A *  2/1987 Batt ......................... H05K 9/00
174/36

(Continued)

FOREIGN PATENT DOCUMENTS

EP          1976072 A1    10/2008
JP        61-193498 A      8/1986
(Continued)

OTHER PUBLICATIONS

International Search Report for PCT/JP2012/078150 dated Dec. 4, 2012.
(Continued)

*Primary Examiner* — Steven T Sawyer
*Assistant Examiner* — Paresh H Paghadal
(74) *Attorney, Agent, or Firm* — Sughrue Mion, PLLC (57) ABSTRACT

An electric wire branching structure (1) branches a shielded electric wire (30) with a plurality of electric wires (10) from a main wire (30A) to a plurality of branch wires (30B, 30C). The electric wire branching structure (1) includes an electroconductive shield member (100) configured to cover the electric wires (10) corresponding to the main wire (30A) and the branch wires (30B, 30C). The shield member (100) has a plurality of electric wire insertion openings (111, 112) for the electric wires (10) corresponding to the branch wires (30B, 30C) to be inserted for each of the branch wires (30B, 30C).

3 Claims, 6 Drawing Sheets

(51) Int. Cl.
  *H01R 25/00* (2006.01)
  *H02G 3/04* (2006.01)
  *H02G 15/02* (2006.01)
  *H01R 4/28* (2006.01)
  *H01R 9/03* (2006.01)
  *H01R 13/516* (2006.01)
  *H01R 13/53* (2006.01)
  *H01R 13/648* (2006.01)
  *H01R 13/641* (2006.01)
  *H01B 7/00* (2006.01)

(52) U.S. Cl.
  CPC ........... *H01R 25/00* (2013.01); *H02G 3/0487* (2013.01); *H02G 15/02* (2013.01); *H01B 7/0045* (2013.01); *H01R 13/516* (2013.01); *H01R 13/53* (2013.01); *H01R 13/641* (2013.01); *H01R 13/648* (2013.01); *H02G 3/0462* (2013.01)

(58) Field of Classification Search
  CPC ........... H01R 13/5808; H01R 13/6593; H02G 3/0462; H02G 3/0487; H02G 3/0666
  USPC .............. 174/34, 66, 67, 93, 351; 439/607.1
  See application file for complete search history.

(56) References Cited

U.S. PATENT DOCUMENTS

| | | | | |
|---|---|---|---|---|
| 4,678,865 A * | 7/1987 | Sherwin | ......................... | 174/36 |
| 5,035,657 A | 7/1991 | Hass et al. | | |
| 5,091,604 A * | 2/1992 | Kirma | .................. | H02G 3/0666 174/2 |
| 5,126,507 A * | 6/1992 | Kirma | ...................... | H05K 9/00 138/108 |
| 5,347,089 A * | 9/1994 | Barrat | ................. | B29C 61/0641 156/49 |
| 5,631,444 A * | 5/1997 | Rook | ...................... | H01R 4/646 174/78 |
| 5,723,820 A * | 3/1998 | Whitney | ................ | H02G 5/061 174/71 R |
| 6,160,216 A * | 12/2000 | McMahon | ........... | H01B 7/0045 174/102 R |
| 6,767,255 B1 * | 7/2004 | Croswell | .............. | H01R 25/003 439/106 |
| 6,874,502 B1 * | 4/2005 | Nashed | ............. | A61M 16/0051 128/202.27 |
| 7,275,960 B2 * | 10/2007 | Fukushima et al. | ...... | 439/607.15 |
| 7,687,714 B2 * | 3/2010 | Deterre | ..................... | H01R 4/72 174/72 A |
| 8,692,114 B1 * | 4/2014 | Popescu | ............... | H05K 9/0018 174/71 R |
| 9,203,177 B2 * | 12/2015 | Tanaka | ................... | H01R 13/56 |
| 9,414,533 B2 * | 8/2016 | Yanagihara | .......... | H02G 3/0487 |
| 9,613,730 B2 * | 4/2017 | Tanaka | ................. | H01B 7/0045 |
| 2005/0266729 A1 * | 12/2005 | Fukushima | ............ | H01R 9/032 439/607.46 |
| 2007/0087621 A1 * | 4/2007 | Fukushima | .......... | H01R 9/0524 439/460 |
| 2008/0242119 A1 * | 10/2008 | Rosch et al. | .................... | 439/49 |
| 2008/0296037 A1 * | 12/2008 | Burland et al. | ................. | 174/36 |
| 2009/0130903 A1 * | 5/2009 | Tsukashima | ........... | H01R 9/032 439/607.23 |
| 2010/0261365 A1 * | 10/2010 | Sakakura | ...................... | 439/271 |
| 2012/0252272 A1 | 10/2012 | Omae et al. | | |

FOREIGN PATENT DOCUMENTS

| | | |
|---|---|---|
| JP | 3-20878 U | 2/1991 |
| JP | H06152177 A | 5/1994 |
| JP | 2006310065 A | 11/2006 |
| JP | 2008311027 A | 12/2008 |
| JP | 2010-250995 A | 11/2010 |
| JP | 2011-129294 A | 6/2011 |
| JP | 2012084275 A | 4/2012 |
| WO | WO 2011076819 A2 * | 6/2011 |

OTHER PUBLICATIONS

Communication dated Jul. 7, 2015 from the European Patent Office in counterpart application No. 12846431.0.
Communication dated Jan. 21, 2016, from the State Intellectual Property Office of People's Republic of China in counterpart Application No. 201280053434.7.
Communication dated Jan. 26, 2016, from the Japanese Patent Office in counterpart application No. 2011-241030.

* cited by examiner

CABLE BRANCHING STRUCTURE

TECHNICAL FIELD

The present invention relates to an electric wire branching structure used for connection between apparatuses housed in a metal case.

BACKGROUND ART

In an electric vehicle (EV), a hybrid electric vehicle (HEV), and so on, there have been various proposals for a shield structure used for connection between apparatuses (such as a motor and an inverter) housed in a metal case (for example, see Patent Literature 1).

The shield structure is provided with a shielded electric wire in which a plurality of electric wires are collectively covered with a braided wire, and terminals connected to both ends of the shielded electric wire are mounted to a connector.

Each connector is provided with an electroconductive metal shell attached to a case housing an apparatus therein and covering an internal conductor (such as a terminal), and an end of the braided wire is connected to each metal shell. According to this constitution, the braided wire is electrically connected to the case, and radiation of electromagnetic waves can be prevented.

CITATION LIST

Patent Literature

Patent Literature 1: Japanese Unexamined Patent Application Publication No. 2010-250995

SUMMARY OF INVENTION

However, in the above-described associated shield structure, when a plurality of (for example, two) apparatuses are connected from one apparatus, a plurality of shielded electric wires are required. Namely, in the associated shield structure, a plurality of one connectors provided at one end of the shielded electric wire and a plurality of the other connectors provided at the other end of the shielded electric wire are required to be provided, so that a space for arrangement of one connectors and the other connectors is increased.

An object of the present invention is to provide an electric wire branching structure which can prevent radiation of electromagnetic waves and, at the same time, reduce a space for arrangement of a connector attached to one end of a shielded electric wire.

An electric wire branching structure in accordance with some embodiments of the present invention branches a shielded electric wire with a plurality of electric wires from a main wire to a plurality of branch wires. The electric wire branching structure includes an electroconductive shield member configured to cover the electric wires corresponding to the main wire and the branch wires. The shield member has a plurality of electric wire insertion openings for the electric wires corresponding to the branch wires to be inserted for each of the branch wires.

According to the above constitution, the shield member covers the electric wires corresponding to the main wire and the branch wires. Consequently, when the electric wire branching structure is used for connection between apparatuses (such as a motor and an inverter) housed in a metal case, the radiation of electromagnetic waves can be prevented.

The shield member has a plurality of electric wire insertion openings into which the electric wires corresponding to the branch wires are inserted for each branch wire. According to this constitution, since the electric wire is branched from the main wire through each of the electric wire insertion openings so as to correspond to the branch wires, a space for arrangement of connectors attached to an end of the main wire can be reduced.

The shield member may include a main wire shield member formed of a metal shell with the electric wire insertion openings and configured to cover the electric wire corresponding to the main wire, and a plurality of branch wire shield members connected to the main wire shield member and configured to cover the electric wires corresponding to the branch wires.

According to the above constitution, the shield member has the main wire shield member and a plurality of the branch wire shield members, and the main wire shield member is constituted of an electroconductive metal shell having the electric wire insertion openings. Consequently, the electric wires corresponding to the main wire and the branch wires can be reliably covered, and moreover, a branched portion between the main wire and the branch wires can be reliably covered by the metal shell; therefore, the radiation of electromagnetic waves can be more reliably prevented.

Further, the shield member itself is not required to be branched from the main wire so as to correspond to the branch wires. Thus, various types of shield members are not manufactured corresponding to the shape, direction, and so on of branching of the shield members, and the existing branch wire shield member (for example, a braided wire) can be used. Accordingly, manufacturing cost for the branch wire shield member can be reduced, and as a use application of the branch wire shield member increases, versatility of the branch wire shield member is increased.

Further, the number of the electric wire insertion openings to be formed in a metal shell is set, whereby it is possible to correspond to various branch wires. Namely, while the existing branch wire shield member is used, it is possible to correspond to various patterns of branching of an electric wire simply by changing the metal shell, and a degree of freedom of the electric wire branching structure increases.

The metal shell may include a plurality of intermediate shells with the respective electric wire insertion openings and a main body shell for the intermediate shells to be attached, the main body shell having a single opening in communication with the electric wire insertion openings in a state that the intermediate shells are attached to the main body shell, and the intermediate shells with the electric wire corresponding to the main wire branched to the electric wires corresponding to the branch wires may be attached to the single opening.

According to the above constitution, the metal shell has a plurality of the intermediate shells and the main body shell, and each intermediate shell is attached to the opening of the main body shell. According to this constitution, only each intermediate shell is set without changing the main body shell, whereby it is possible to correspond to various branch wires. Namely, while the existing branch wire shield member is used, it is possible to correspond to various patterns of branching of an electric wire simply by changing each intermediate shell, and the degree of freedom of the electric wire branching structure increases.

The shield member may include a main wire cover configured to cover the electric wire corresponding to the main wire and a plurality of branch wire covers formed integrally with the main wire cover and configured to cover the electric wires corresponding to the branch wires, the main wire cover and the branch wire covers may be formed of any one of a braided wire or a metal foil, and the branch wire covers may have the electric wire insertion openings respectively and the branch wire covers with the electric wire corresponding to the main wire branched to the electric wires corresponding to the branch wires may be configured to cover the electric wires corresponding to the branch wires.

According to the above constitution, the shield member has the main wire cover and a plurality of the branch wire cover, the branch wire covers each have the electric wire insertion opening and cover the electric wires corresponding to the branch wires while the electric wire corresponding to the main wire is branched to the electric wires corresponding to the branch wires. Consequently, while the radiation of electromagnetic waves is prevented, the electric wire is branched from the main wire so as to correspond to each branch wire, and therefore, the space for arrangement of the connector attached to the end of the main wire can be reduced.

According to embodiments of the present invention, an electric wire branching structure which prevents radiation of electromagnetic waves and, at the same time, can reduce a space for arrangement of a connector attached to one end of a shielded electric wire can be provided.

DESCRIPTION OF EMBODIMENTS

Next, an embodiment of an electric wire branching structure according to the present invention will be described with reference to the drawings. Specifically, (1) first embodiment, (2) second embodiment, (3) third embodiment, (4) fourth embodiment, and (5) other embodiments will be described.

In the following description of the drawings, the same or similar components are denoted by the same or similar reference numerals. However, it should be noted that the drawings are schematic, and dimensional ratios and so on are different from the actual ones.

Accordingly, specific dimensions and so on should be determined in consideration of the following description. Moreover, the drawings also include portions having different dimensional relationships and ratios from each other.

(1) First Embodiment (Configuration of Electric Wire Branching Structure)

Figure 1:
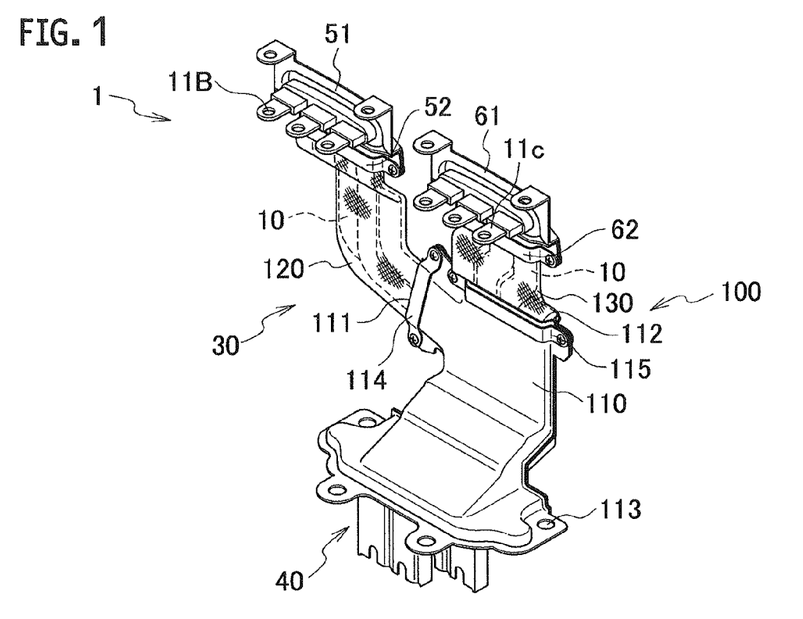
FIG. 1 is a perspective view illustrating an electric wire branching structure according to a first embodiment.
Figure 2:
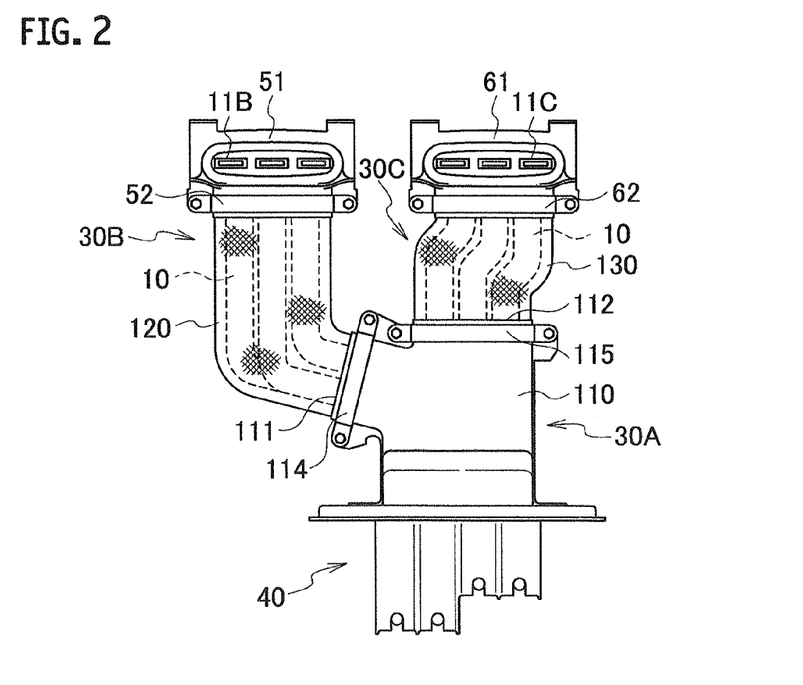
FIG. 2 is a plan view illustrating the electric wire branching structure according to the first embodiment.

First, configuration of an electric wire branching structure 1 according to a first embodiment will be described with reference to the drawings. FIG. 1 is a perspective view illustrating an electric wire branching structure 1 according to the first embodiment. FIG. 2 is a plan view illustrating the electric wire branching structure 1 according to the first embodiment.

As illustrated in FIGS. 1 and 2, the electric wire branching structure 1 is used for connection between unillustrated apparatuses (such as a motor and an inverter) housed in an electroconductive metal case (not illustrated). In the electric wire branching structure 1, a shielded electric wire 30 having a plurality of electric wires 10 is branched from a main wire 30A to a plurality of (two in this embodiment) branch wires 30B and 30C.

The electric wire branching structure 1 is provided with an electroconductive shield member 100 covering the electric wires 10 corresponding to the main wire 30A and the branch wires 30B and 30C. The details of the shield member 100 will be described later.

The electric wire 10 corresponding to the main wire 30A is provided with a terminal (not illustrated) at the front end, and the terminal is mounted to a connector 40. Meanwhile, the electric wires 10 corresponding to the branch wires 30B and 30C are provided respectively with terminals 11B and 11C at the front ends, and each of the terminals 11B and 11C is mounted to a connector (not illustrated). The connector 40 and so on provided at the front end of the electric wire 10 are fitted in a mating connector (not illustrated) connected to an apparatus in a metal case.

(Configuration of Shield Member)

Next, configuration of the above-described shield member 100 will be described with reference to FIGS. 1 and 2.

As illustrated in FIGS. 1 and 2, the shield member 100 has a main wire shield member 110 covering the electric wire 10 corresponding to the main wire 30A and a plurality of branch wire shield members 120 and 130 covering the electric wires 10 corresponding to the branch wires 30B and 30C.

The main wire shield member 110 has a box shape following a fitting direction between the connector 40 and the mating connector (not illustrated) and is connected to the branch wire shield members 120 and 130. The main wire shield member 110 has a plurality of electric wire insertion openings 111 and 112 into which the electric wires 10 corresponding to the branch wires 30B and 30C are inserted for each of the branch wires 30B and 30C. The electric wire insertion openings 111 and 112 are opened in different directions (about 90 degrees) in a state of being adjacent to each other along an opening longitudinal direction.

In the first embodiment, the main wire shield member 110 is constituted of an electroconductive metal shell. The metal shell is integrally formed with the connector 40 fitted in the mating connector (not illustrated) connected to the apparatus in the metal case. The connector 40 has a plurality of insertion holes 113 through which a fixing member such as a bolt used for fixing the connector 40 to the metal case can be inserted.

The main wire shield member 110 (metal shell) is not necessarily integrally formed with the connector 40, and the main wire shield member 110 may be formed separately from the connector 40 and mounted to a housing of the connector 40.

Each of the branch wire shield members 120 and 130 is formed by a braided wire cutting off noise from outside. The respective one ends of the branch wire shield members 120 and 130 are crimped by crimp members 114 and 115 in such a state that the electric wire insertion openings 111 and 112 of the main wire shield member 110 are covered, and thereby attached to the main wire shield member 110. Meanwhile, the respective other ends of the branch wire shield members 120 and 130 are crimped by crimp members 52 and 62 in such a state that metal shells 51 and 61 of a connector (not illustrated) are partially covered, and thereby fixed to the metal shells 51 and 61.

(Operation/Effect)

In the above-described first embodiment, the shield member 100 covers the electric wires 10 corresponding to the main wire 30A and the branch wires 30B and 30C. According to this constitution, when the electric wire branching structure 1 is used for connection between apparatuses (such as a motor and an inverter) housed in a metal case, radiation of electromagnetic waves can be prevented.

The shield member 100 has a plurality of the electric wire insertion openings 111 and 112 into which the electric wires 10 corresponding to the branch wires 30B and 30C are inserted for each of the branch wires 30B and 30C. According to this constitution, since the electric wire 10 is branched from the main wire 30A through the electric wire insertion openings 111 and 112 so as to correspond to the branch wires 30B and 30C, the space for arrangement of the connector 40 attached to the end of the main wire 30A can be reduced.

In the first embodiment, the shield member 100 has the main wire shield member 110 and a plurality of the branch wire shield members 120 and 130, and the main wire shield member 110 is constituted of an electroconductive metal shell having the electric wire insertion openings 111 and 112. According to this constitution, not only the electric wires 10 corresponding to the main wire 30A and the branch wires 30B and 30C can be reliably covered, but also the branched portion between the main wire 30A and the branch wires 30B and 30C can be reliably covered by the metal shell, and therefore, the radiation of electromagnetic waves can be more reliably prevented.

Further, the shield member 100 itself is not required to be branched from the main wire 30A so as to correspond to a plurality of the branch wires 30B and 30C. Thus, various types of the shield members 100 are not manufactured corresponding to the shape, direction, and so on of branching of the shield members 100, and the existing branch wire shield members 120 and 130 (for example, braided wires) can be used. Accordingly, the manufacturing cost for the branch wire shield members 120 and 130 can be reduced, and as a use application of the branch wire shield members 120 and 130 increases, versatility of the branch wire shield members 120 and 130 is increased.

Further, it is possible to correspond to various branch wires 30B and 30C by setting the number of the electric wire insertion openings 111 and 112 of the metal shell. Namely, while the existing branch wire shield members 120 and 130 are used, it is possible to correspond to various patterns of branching of the electric wire 10 simply by changing the metal shell, and a degree of freedom of the electric wire branching structure 1 increases.

(2) Second Embodiment

Figure 3:
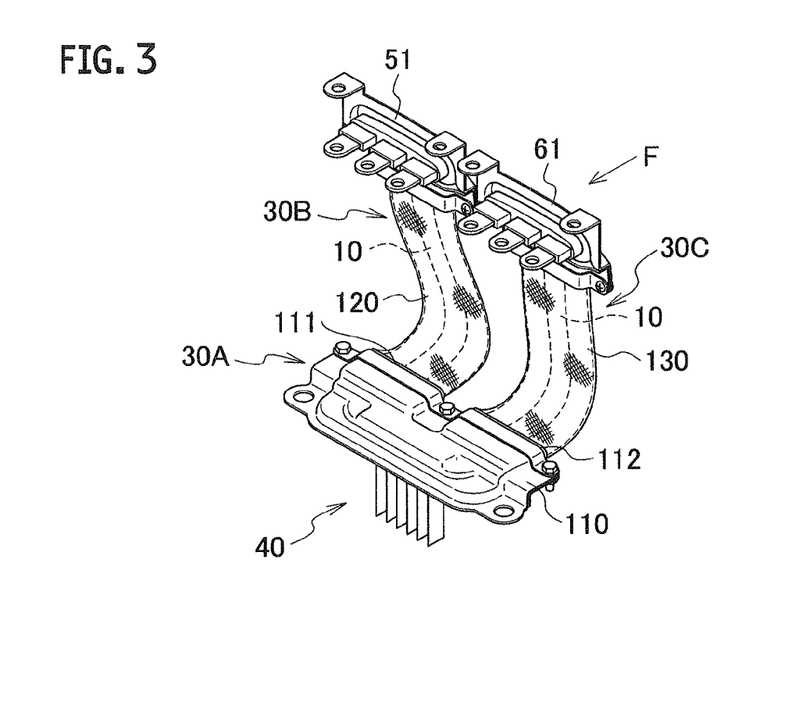
FIG. 3 is a perspective view illustrating an electric wire branching structure according to a second embodiment.
Figure 4:
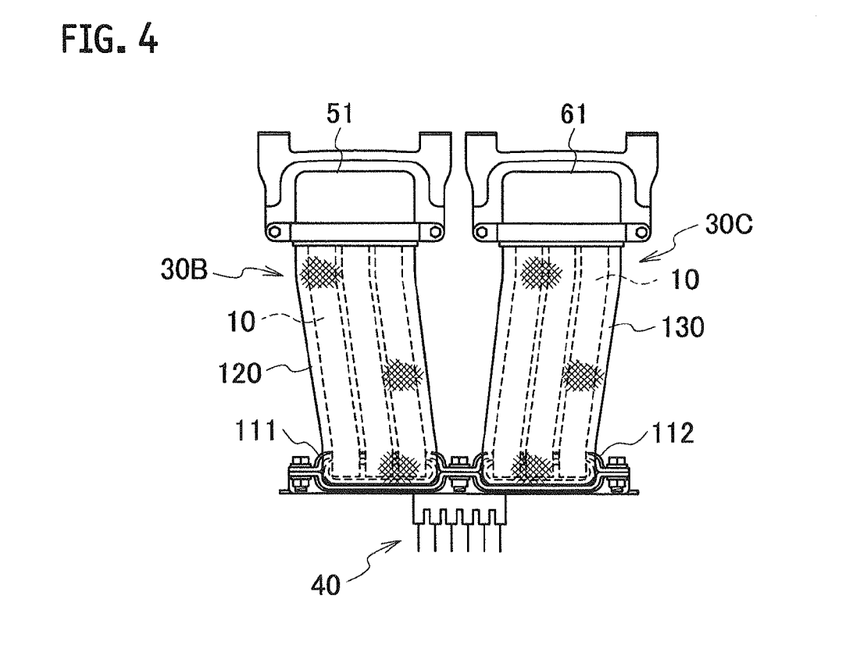
FIG. 4 is a side view (F arrowed view of FIG. 3) illustrating the electric wire branching structure according to the second embodiment.

Next, an electric wire branching structure 1 according to a second embodiment will be described with reference to the drawings. FIG. 3 is a perspective view illustrating the electric wire branching structure 1 according to the second embodiment. FIG. 4 is a side view (F arrowed view of FIG. 3) illustrating the electric wire branching structure 1 according to the second embodiment. The same components as the electric wire branching structure 1 according to the first embodiment are denoted by the same reference numerals, and different portions will be mainly described.

In the above-described first embodiment, the electric wire insertion openings 111 and 112 open in different directions (about 90 degrees).

Meanwhile, in the second embodiment, as illustrated in FIGS. 3 and 4, electric wire insertion openings 111 and 112 formed in a main wire shield member 110 open in the same direction in a state of being adjacent to each other along an opening longitudinal direction. The electric wire insertion openings 111 and 112 are provided along a direction perpendicular to a fitting direction between a connector 40 and a mating connector (not illustrated).

In the second embodiment, similar to the operation and effect of the first embodiment, while the existing branch wire shield members 120 and 130 are used, it is possible to correspond to various patterns of branching of the electric wire 10 simply by changing the electric wire insertion openings 111 and 112 of the metal shell, and the degree of freedom of the electric wire branching structure 1 increases.

(3) Third Embodiment

Figure 5:
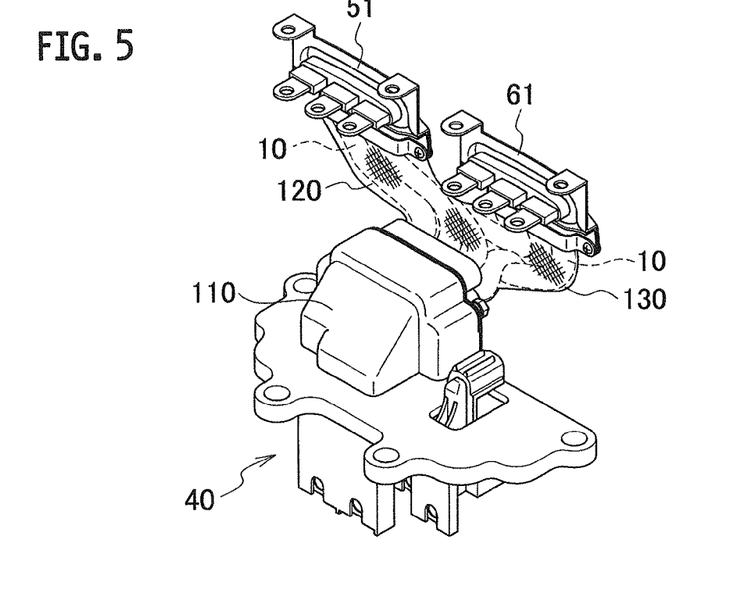
FIG. 5 is a perspective view illustrating an electric wire branching structure according to a third embodiment.
Figure 6:
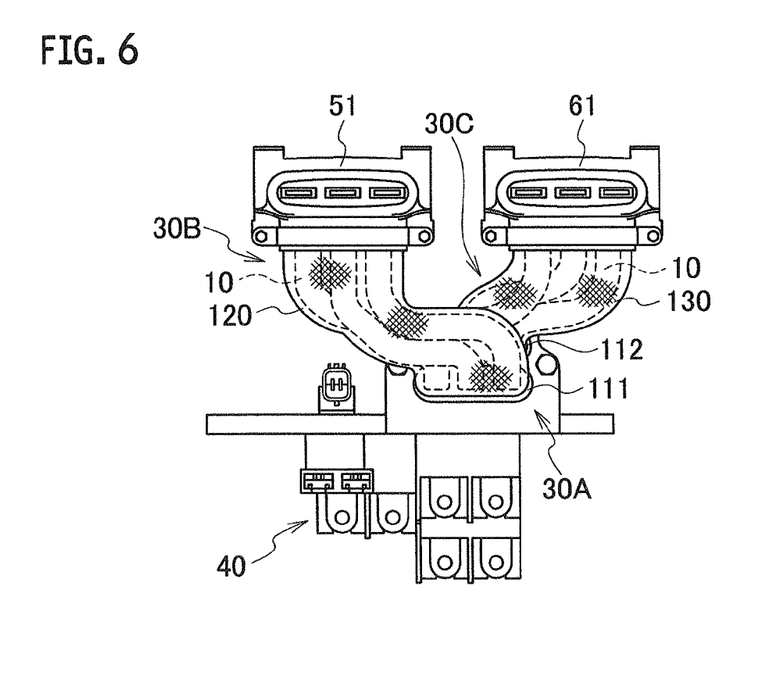
FIG. 6 is a plan view illustrating the electric wire branching structure according to the third embodiment.

Next, an electric wire branching structure 1 according to a third embodiment will be described with reference to the drawings. FIG. 5 is a perspective view illustrating the electric wire branching structure 1 according to the third embodiment. FIG. 6 is a plan view illustrating the electric wire branching structure 1 according to the third embodiment. FIG. 7(a) is an exploded perspective view illustrating a main wire shield member 110 according to the third embodiment. FIG. 7(b) is an enlarged perspective view of a portion of the main wire shield member 110 according to the third embodiment. The same components as the electric wire branching structure 1 according to the first and second embodiments are denoted by the same reference numerals, and different portions will be mainly described.

In the above-described first and second embodiments, the electric wire insertion openings 111 and 112 are provided in a state of being adjacent to each other along an opening longitudinal direction.

Figure 7:
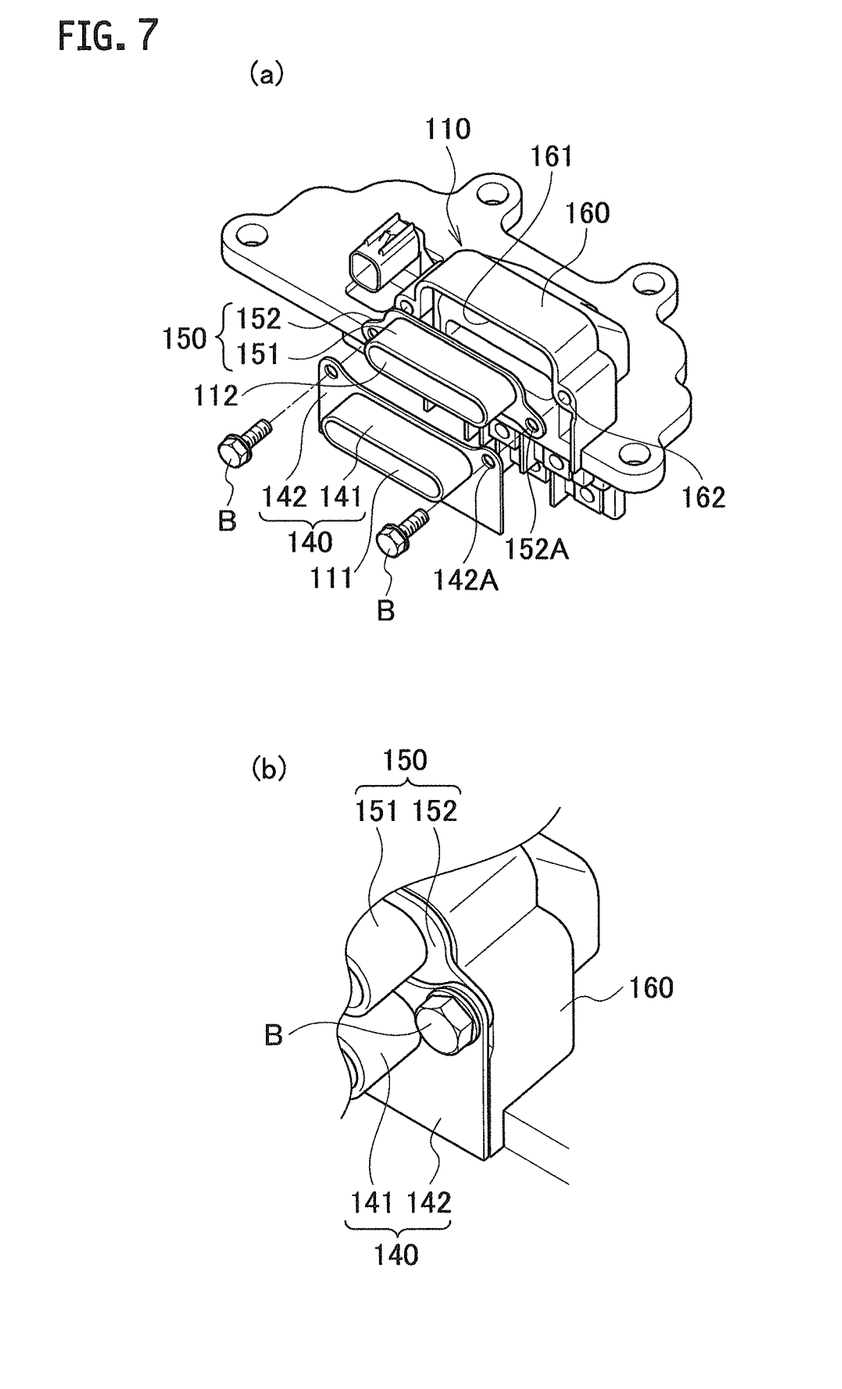
FIG. 7(a) is an exploded perspective view illustrating a main wire shield member according to the third embodiment.
FIG. 7(b) is an enlarged perspective view of a portion of the main wire shield member according to the third embodiment.

Meanwhile, in the third embodiment, as illustrated in FIGS. 5 and 6, electric wire insertion openings 111 and 112 are provided in a state of being adjacent to each other along an opening short direction. Specifically, as illustrated in FIG. 7, the main wire shield member 110 (metal shell) has a plurality of intermediate shells 140 and 150 having the electric wire insertion openings 111 and 112, respectively, and a main body shell 160 to which the intermediate shells 140 and 150 are attached.

The intermediate shells 140 and 150 each have electroconductivity and are attached to the main body shell 160. The intermediate shells 140 and 150 are constituted of tubular main body portions 141 and 151 having the electric wire insertion openings 111 and 112, respectively, and flange portions 142 and 152 which are continuous with the respective one end sides of the main body portions 141 and 151.

The one ends of branch wire shield members 120 and 130 are attached respectively to the main body portions 141 and 151. The one ends of the branch wire shield members 120 and 130 are crimped by crimp members (not illustrated) in such a state that the main body portions 141 and 151 are covered, and thereby fixed respectively to the main body portions 141 and 151. The flange portions 142 and 152 have bolt holes 142A and 152A through which bolts B can be inserted.

The main body shell 160 has electroconductivity as in the intermediate shells 140 and 150, and the intermediate shells 140 and 150 are attached to the main body shell 160. The main body shell 160 is integrally formed with a connector 40. The main body shell 160 is not necessarily integrally formed with the connector 40, and the main body shell 160 may be formed separately from the connector 40 and mounted to a housing of the connector 40.

The main body shell 160 is provided with a single opening 161 communicating with the electric wire insertion openings 111 and 112 in such a state that the intermediate shells 140 and 150 are attached to the main body shell 160. The intermediate shells 140 and 150 are attached to the opening 161 in such a state that a electric wire 10 corresponding to a main wire 30A is branched to electric wires 10 corresponding to branch wires 30B and 30C. In the third embodiment, as illustrated in FIG. 7(b), the bolts B are inserted through bolt holes 162 of the main body shell 160 and bolt holes 142A and 152A to fasten the intermediate shells 140 and 150 together with the main body shell 160.

In the above-described third embodiment, the main wire shield member 110 (metal shell) has a plurality of the intermediate shells 140 and 150 and the main body shell 160, and the intermediate shells 140 and 150 are attached to the opening 161 of the main body shell 160. According to this constitution, it is possible to correspond to various branch wires 30B and 30C simply by setting the intermediate shells 140 and 150 without changing the main body shell 160. Namely, while the existing branch wire shield members 120 and 130 are used, it is possible to correspond to various patterns of branching of the electric wire 10 simply by changing the intermediate shells 140 and 150, and the degree of freedom of the electric wire branching structure 1 increases.

In the third embodiment, the intermediate shells 140 and 150 are fastened together with the main body shell 160. With this constitution, the number of components can be reduced, and manufacturing cost for the electric wire branching structure 1 can be reduced.

(4) Fourth Embodiment

Figure 8:
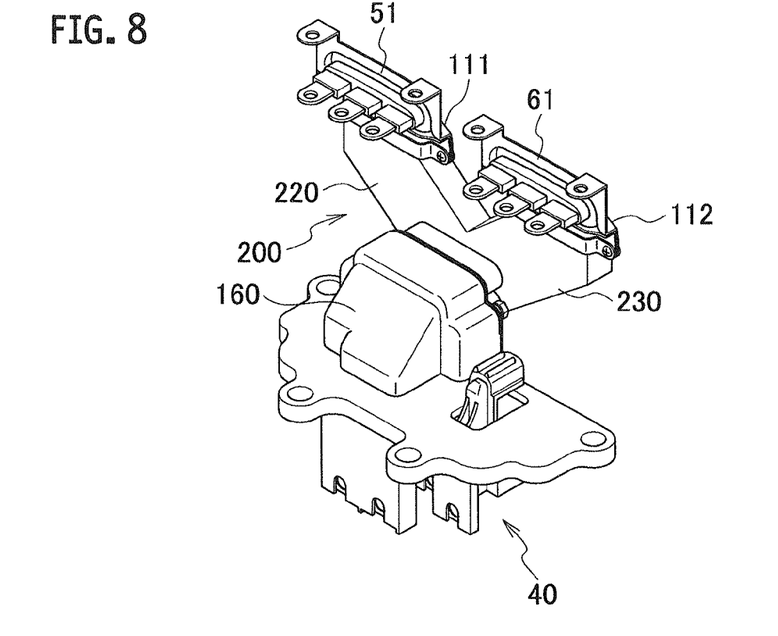
FIG. 8 is a perspective view illustrating an electric wire branching structure according to a fourth embodiment.
Figure 9:
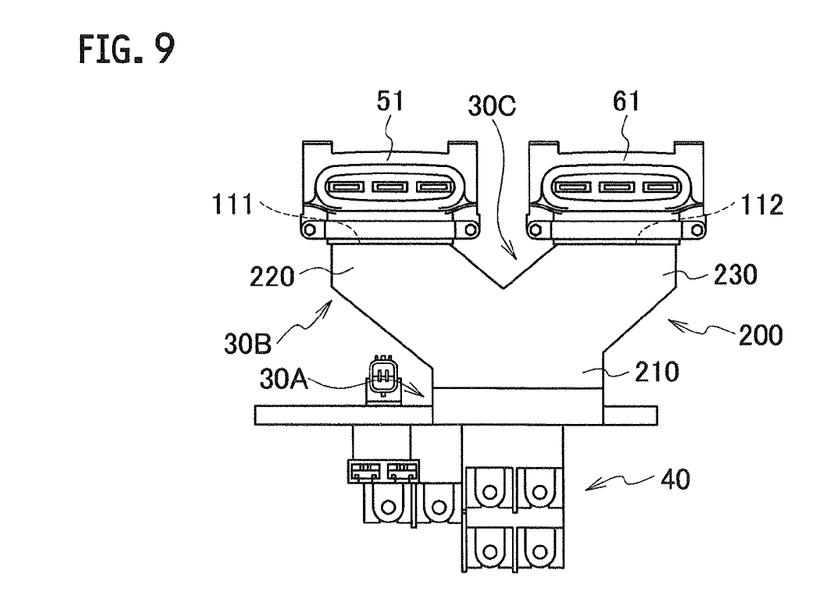
FIG. 9 is a plan view illustrating the electric wire branching structure according to the fourth embodiment.
Figure 10:
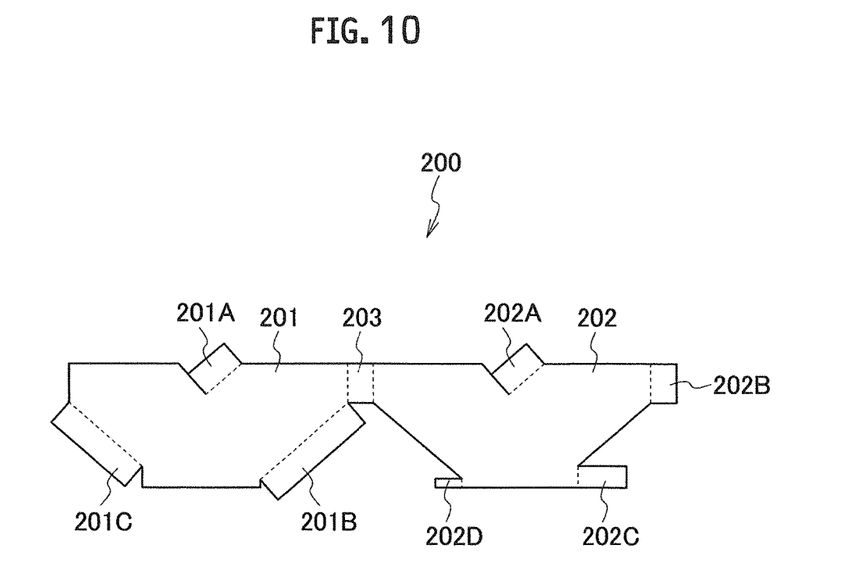
FIG. 10 is a development view illustrating a shield member (metal foil) according to the fourth embodiment.

Next, an electric wire branching structure 1 according to a fourth embodiment will be described with reference to the drawings. FIG. 8 is a perspective view illustrating the electric wire branching structure 1 according to the fourth embodiment. FIG. 9 is a plan view illustrating the electric wire branching structure 1 according to the fourth embodiment. FIG. 10 is a development view illustrating a shield member 100 (metal foil) according to the fourth embodiment. The same components as the electric wire branching structure 1 according to the first to third embodiments are denoted by the same reference numerals, and different portions will be mainly described.

In the above-described first to third embodiments, the branch wire shield members 120 and 130 in the shield member 100 are formed by braided wires cutting off noise from outside.

In contrast, in the fourth embodiment, branch wire shield members 120 and 130 in a shield member 200 are formed by a metal foil cutting off noise from outside.

Specifically, as illustrated in FIGS. 8 to 10, the shield member 200 has a main wire cover 210 formed by a metal foil covering a electric wire 10 corresponding to a main wire 30A and a plurality of branch wire covers 220 and 230 formed by the metal foil covering the electric wires 10 corresponding to branch wires 30B and 30C.

A plurality of the branch wire covers 220 and 230 are integrally formed with the main wire cover 210. The branch wire covers 220 and 230 respectively have electric wire insertion openings 111 and 112 and cover the electric wires 10 corresponding to the branch wires 30B and 30C in such a state that the electric wire 10 corresponding to the main wire 30A is branched to the electric wires 10 corresponding to the branch wires 30B and 30C.

As illustrated in FIG. 10, the shield member 200 (the main wire cover 210 and the branch wire covers 220 and 230) is constituted almost of a first plane 201 located at one side of the electric wire 10 and a second plane 202 coupled to the first plane 201 through a coupling portion 203. The first plane 201 is provided with a plurality of folded back portions 201A to 201C, and the second plane 202 is also provided with a plurality of folded back portions 202A to 202D. The first plane 201, the second plane 202, the folded back portions 201A to 201C and 202A to 202D are attached by a stapler, a tape, welding, an adhesive, or the like in such a state that all the electric wires 10 corresponding to the main wire 30A and the branch wires 30B and 30C are covered.

In the above-described fourth embodiment, the shield member 200 has the main wire cover 210 and a plurality of the branch wire covers 220 and 230, and the branch wire covers 220 and 230 have the electric wire insertion openings 111 and 112, respectively, and cover the electric wires 10 corresponding to the branch wires 30B and 30C in such a state that the electric wire 10 corresponding to the main wire 30A is branched to the electric wires 10 corresponding to the branch wires 30B and 30C. According to this constitution, since the electric wire 10 is branched from the main wire 30A so as to correspond to the branch wires 30B and 30C while preventing the radiation of electromagnetic waves, a space for arrangement of a connector 40 attached to an end of the main wire 30A can be reduced.

Further, in the fourth embodiment, the branch wire shield members 120 and 130 are formed by the metal foil. According to this constitution, the electric wire 10 corresponding to the main wire 30A can be branched to the electric wires 10 corresponding to the branch wires 30B and 30C, using the existing metal foil. Thus, in comparison with the case where the branch wire shield members 120 and 130 are formed by braided wires, the branch wire shield members 120 and 130 can be more simplified and can be formed at lower cost, and therefore, the manufacturing cost for the electric wire branching structure 1 can be further reduced.

In the fourth embodiment, although the connector 40 illustrated in FIGS. 8 and 9 has the shape and configuration similar to those in the third embodiment, the connector 40 does not necessarily have the shape and configuration similar to those in the third embodiment and may have the shape and configuration similar to those in the first and second embodiments.

(5) Other Embodiments

As described above, although the contents of the present invention have been disclosed through the embodiments of the present invention, it is not to be understood that the descriptions and the drawings constituting part of this disclosure limit the scope of this invention. It is obvious to those skilled in the art that various alternative embodiments, examples, and technical applications are possible from this disclosure.

For example, the embodiments of the present invention can be changed as follows. Specifically, although it has been described that the shielded electric wire 30 is branched from the main wire 30A to the two branch wires 30B and 30C, this invention is not limited thereto, and the shielded electric wire 30 may be branched from the main wire 30A to two or more branch wires.

The connector 40 and so on to which the shielded electric wire 30 is attached are not limited to the ones described in the embodiments, and it will be understood that well-known connectors having other configurations may be used.

The present invention has been described based on an embodiment, but the present invention is not limited to such an embodiment and the component of each unit can be replaced by a unit of any configuration having a similar function.

The entire content of Japanese Patent Application No. 2011-241030 (filing date: Nov. 2, 2011) is incorporated herein by reference.

The invention claimed is:

1. An electric wire branching structure comprising:
   an electroconductive shield member configured to shield a first electric wire wired from a main wire bundle to a first branch wire and a second electric wire wired from the main wire bundle to a second branch wire,
   wherein the shield member has a first electric wire insertion opening for the first electric wire to be inserted and for wiring the first electric wire from the main wire bundle to the first branch wire, and
   a second electric wire insertion opening for the second electric wire to be inserted and for wiring the second electric wire from the main wire bundle to the second branch wire, the second electric wire insertion opening being formed separately from the first electric wire insertion opening, such that the second electric wire insertion opening and the first electric wire insertion opening are unconnected to each other, and
   wherein the shield member includes:
   a main wire shield member formed of a metal shell and a one-piece construction with a connector, with the first electric wire insertion opening and the second electric wire insertion opening and configured to shield the first electric wire and the second electric wire,
   a first branch wire shield member, separate from the first electric wire and the second electric wire, connected to the first electric wire insertion opening of the main wire shield member and configured to shield the first electric wire of the first branch wire, the first branch wire shield member being formed of a braided wire, and
   a second branch wire shield member, separate from the first electric wire and the second electric wire, connected to the second electric wire insertion opening of the main wire shield member and configured to shield the second electric wire of the second branch wire, the second branch wire shield member being formed of a braided wire,
   wherein respective ends of the first and second branch wire shield members are crimped by first and second crimp members, respectively, in such a state that the first and second electric wire insertion openings of the main wire shield member are covered, and thereby attached to the main wire shield member.

2. The electric wire branching structure according to claim 1, wherein the connector is fitted in a mating connector connected to an apparatus in a metal case.

3. The electric wire branching structure according to claim 2, wherein the connector comprises an insertion hole through which a fixing member used for fixing the connector to the metal case is inserted.

* * * * *